(12) United States Patent
Takenaka et al.

(10) Patent No.: US 9,349,042 B2
(45) Date of Patent: May 24, 2016

(54) HUMAN DETECTION AND TRACKING APPARATUS, HUMAN DETECTION AND TRACKING METHOD, AND HUMAN DETECTION AND TRACKING PROGRAM

(71) Applicant: Panasonic Corporation, Osaka (JP)

(72) Inventors: Shinji Takenaka, Miyagi (JP); Kazuhiko Iwai, Kanagawa (JP); Mitsuko Fujita, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 116 days.

(21) Appl. No.: 14/151,137

(22) Filed: Jan. 9, 2014

(65) Prior Publication Data

US 2014/0211994 A1 Jul. 31, 2014

(30) Foreign Application Priority Data

Jan. 30, 2013 (JP) ................................. 2013-015304

(51) Int. Cl.
*G06K 9/00* (2006.01)

(52) U.S. Cl.
CPC ........ *G06K 9/00362* (2013.01); *G06K 9/00369* (2013.01)

(58) Field of Classification Search
CPC .......... G06T 2207/30196; G06T 2207/10016; G06T 2007/30232; G06T 2207/20076; G06T 2207/30241; G06T 7/2033; G06K 9/00369; G06K 9/00771; G06K 9/00375; G06K 9/00355; G06K 9/00248; G06K 9/00261; G06K 9/00342; G06K 9/00362
USPC ........................................ 382/103, 173, 128
See application file for complete search history.

(56) References Cited

U.S. PATENT DOCUMENTS

| | | | | |
|---|---|---|---|---|
| 7,613,325 B2* | 11/2009 | Iwasaki | ..................... | G06T 7/20 348/143 |
| 8,098,891 B2* | 1/2012 | Lv | .......................... | G06T 7/2086 348/143 |
| 8,401,243 B2* | 3/2013 | Komoto | ................ | G06T 7/2033 382/107 |
| 2004/0091153 A1* | 5/2004 | Nakano | .............. | G06K 9/00362 382/228 |
| 2007/0021199 A1* | 1/2007 | Ahdoot | .............. | A63B 24/0003 463/30 |
| 2008/0123968 A1* | 5/2008 | Nevatia | .............. | G06K 9/00369 382/228 |

(Continued)

FOREIGN PATENT DOCUMENTS

JP 2004-206656 A 7/2004

*Primary Examiner* — Stephen R Koziol
*Assistant Examiner* — Shaghayegh Azima
(74) *Attorney, Agent, or Firm* — Pearne & Gordon LLP

(57) ABSTRACT

A human detection and tracking apparatus prevents errors in a size of a person and a location of body parts between actual image data and a tracking result. Human frame detecting section detects, from first image data, a human frame as a region having high possibility of presence of a human, based on human feature data representing a feature of an entire human body. Body part frame location determining section determines a body part frame in the first image data, based on part feature data illustrating a feature of a body part of the human and a part frame determined as a region having high possibility of presence of a body part of the human in second image data previous to the first image data. Body part frame location correcting section corrects, based on the human frame, a location of the part frame determined in the first image data.

15 Claims, 6 Drawing Sheets

(56) References Cited

U.S. PATENT DOCUMENTS

| | | | |
|---|---|---|---|
| 2010/0290668 A1* | 11/2010 | Friedman | G06K 9/00604 382/103 |
| 2013/0070105 A1* | 3/2013 | Ike | G06K 9/00355 348/169 |
| 2013/0136303 A1* | 5/2013 | Tsukamoto | G06K 9/00577 382/103 |
| 2013/0216094 A1* | 8/2013 | DeLean | G06K 9/00335 382/103 |
| 2013/0230245 A1* | 9/2013 | Matsumoto | G06K 9/00369 382/173 |
| 2014/0204362 A1* | 7/2014 | Iwasawa | G01S 17/42 356/5.01 |
| 2014/0219550 A1* | 8/2014 | Popa | G06K 9/00342 382/154 |
| 2015/0055828 A1* | 2/2015 | Zhao | G01S 17/50 382/103 |

* cited by examiner

HUMAN DETECTION AND TRACKING APPARATUS, HUMAN DETECTION AND TRACKING METHOD, AND HUMAN DETECTION AND TRACKING PROGRAM

CROSS REFERENCE TO RELATED APPLICATIONS

The disclosure of Japanese Patent Application No. 2013-015304, filed on Jan. 30, 2013, including the specification, drawings and abstract is incorporated herein by reference in its entirety.

TECHNICAL FIELD

The present invention relates to a human detection and tracking apparatus, a human detection and tracking method, and a human detection and tracking program capable of detecting a human from image data and tracking body parts of the human for a plurality of successive frames.

BACKGROUND ART

PTL 1 discloses a technique for detecting a human from image data, and tracking body parts of the human for a plurality of successive frames, for example. According to the technique in PTL 1, features extracted from the image data and features of body parts of human learnt in advance (for example, luminance edge information, color information, texture information and others) are matched. The technique according to PTL 1 uses the matching to determine a plurality of regions with high possibility of presence of a body part (hereafter referred to as "body part frame"), and to find out a relative positional relationship between body part frames determined. Subsequently, the technique according to PTL 1 tracks each body part based on the relative positional relationship between the body part frames determined over a plurality of frames.

CITATION LIST

Patent Literature

PTL 1: Japanese Patent Application Laid-Open No 2004-206656

SUMMARY OF INVENTION

Technical Problem

However, the technique according to PTL 1 has the following problem since the body part is tracked based only on a relative positional relationship between body part frames.

For example, when a person in the image data is dressed in the same color all over the body, the color information is identical in all body parts, and thus there is no difference in feature between the body part frames. In this case, when the person in the image data is walking, for example, each body part frame converges to a torso body part. This is because, movements accompanying walking cause significant changes in a leg part compared to the torso part, and thus luminance edge information or texture information tends to be matched to the torso part which is less likely to be affected by the movements accompanying walking than the body part frame.

Accordingly, when the person keeps walking over a plurality of frames, the technique according to PTL 1 makes it difficult to accurately locate each body part in each frame.

Consequently, the technology according to PTL 1 has a problem in causing errors in size and location of a person between the actual image data and the tracking result.

It is an object of the present invention to prevent the errors in size of the person and the location of the body pails between the actual image data and the tracking result.

Solution to Problem

The human detection and tracking apparatus according to an aspect of the present invention includes: a human frame detecting section that detects, from first image data, a human frame as a region having high possibility of presence of a human, based on human feature data representing a feature of an entire human body; a body part frame location determining section that determines a body part frame in the first image data, based on body part feature data illustrating a feature of a body part of the human and a body part frame determined as a region having high possibility of presence of a body part of the human in second image data previous to the first image data; and a body part frame location correcting section that corrects, based on the human frame, a location of the body part frame determined in the first image data.

The human detection and tracking method according to an aspect of the present invention includes: detecting, from first image data, a human frame as a region having high possibility of presence of a human, based on human feature data representing a feature of an entire human body; determining a body part frame in the first image data, based on body part feature data illustrating a feature of a body part of the human and a body part frame determined as a region having high possibility of presence of a body part of the human in second image data previous to the first image data; and correcting, based on the human frame, a location of the body part frame determined in the first image data.

The human detection and tracking program according to an aspect of the present invention includes: detecting, from first image data, a human frame as a region having high possibility of presence of a human, based on human feature data representing a feature of an entire human body; determining a body part frame in the first image data, based on body part feature data illustrating a feature of a body part of the human and a body part frame determined as a region having high possibility of presence of a body part of the human in second image data previous to the first image data; and correcting, based on the human frame, a location of the body part frame determined in the first image data.

Advantageous Effects of Invention

According to the present invention, the errors in size of the person and the location of the body parts between the actual image data and the tracking result can be prevented.

DESCRIPTION OF EMBODIMENTS

Embodiment 1

Embodiment 1 of the present invention will be described with reference to the drawings.

<Configuration of Human Detection and Tracking Apparatus 100>

Figure 1:
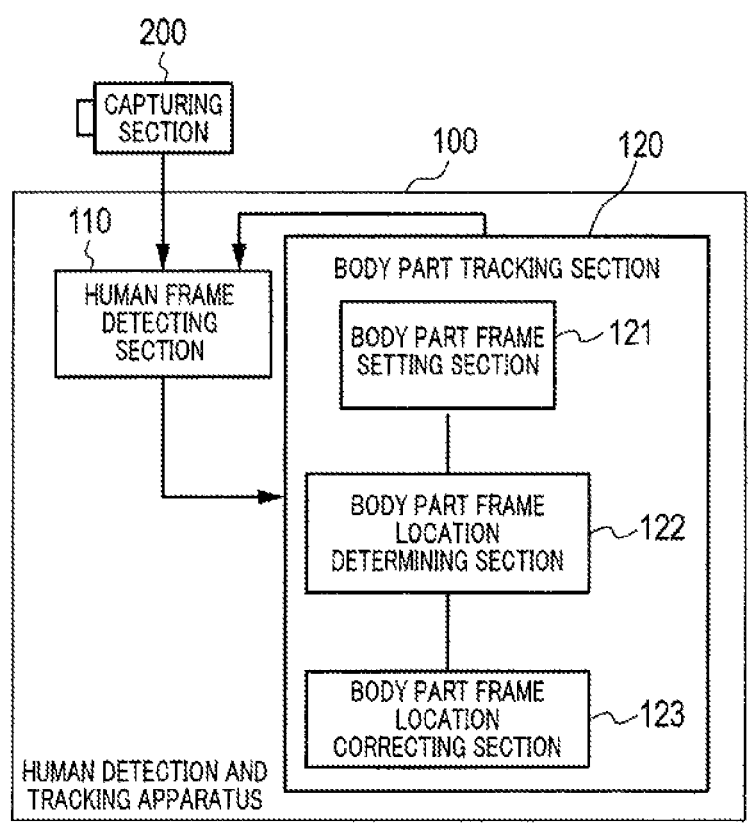
FIG. 1 is a block diagram illustrating an exemplary configuration of a human detection and tracking apparatus according to Embodiment 1 of the present invention.

First, an example of the configuration of human detection and tracking apparatus 100 according to Embodiment 1 of the present invention will be described with reference to FIG. 1. FIG. 1 illustrates the example of the configuration of human detection and tracking apparatus 100 according to Embodiment 1.

In FIG. 1, human detection and tracking apparatus 100 according to Embodiment 1 includes human frame detecting section 110 and body part tracking section 120. Body part tracking section 120 includes body part frame setting section 121, body part frame location determining section 122, and body part frame location correcting section 123.

Figure 2A:
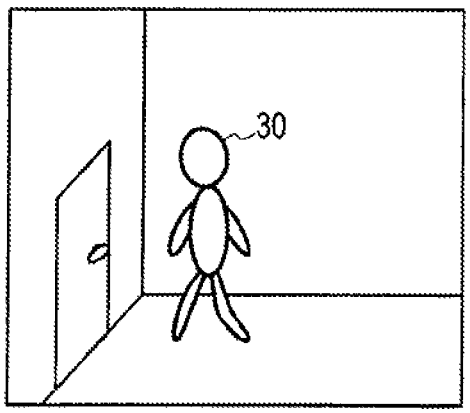
FIGS. 2A to 2F are diagrams for illustrating examples of processes performed by the human detection and tracking apparatus according to Embodiment 1 of the present invention.

Human frame detecting section 110 receives image data from capturing section 200. Capturing section 200 is a camera capturing a predetermined region to be monitored in video. Human frame detecting section 110 receives image data from capturing section 200, which includes a plurality of successive frames. FIG. 2A illustrates an example of the image data. The image data illustrated in FIG. 2A includes one frame of the image data captured by capturing section 200, capturing the region to be monitored. For example, the image data in FIG. 2A includes an image of a human body 30 standing straight.

Subsequently, each time image data for one frame is received, human frame detecting section 110 matches the image data with human feature data learned in advance. The human feature data is data representing features of a human body as a whole, and includes luminance edge information, color information, texture information, and so on, for example. The human feature data is data representing a posture of a person (for example, upright posture). Note that, the human feature data is stored in a predetermined database or others in advance, and is read by human frame detecting section 110 at the time of matching. The database for storing the human feature data may be included in either inside or outside human detecting section 110.

Figure 2B:
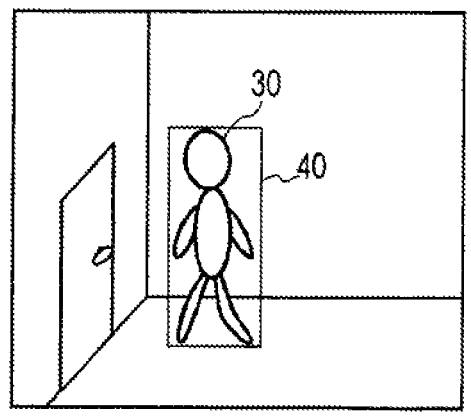

As a result of the matching, when there is a region matching the human feature data in the image data, human frame detecting section 110 detects the region as a region having high possibility of presence of human (hereafter referred to as "human frame"). The human frame represents an absolute size and a location of the human body. FIG. 2B illustrates an example of the human frame. In FIG. 2B, human frame 40 covers entire human body 30.

Here, human frame detecting section 110 determines whether or not a default body part frame to be described in detail later) is set for the human body included in the detected human frame, based on whether or not a body part frame setting ending notification (to be described in detail later) from body part frame setting section 121 is present. Stated differently, human frame detecting section 110 determines whether or not tracking on a body part of the human body included in the detected human frame has already started.

As a result of the determination, when the default body part frame has already set and body part tracking has already started, human frame detecting section 110 sends image data for one frame and human frame information representing the detected human frame to body part frame location determining section 122 in body part tracking section 120. In contrast, as a result of the determination, when the default body part frame is not set, and body part tracking has not yet started, human frame detecting section 110 sends image data for one frame and human frame information representing the detected human frame to body part frame setting section 121 in body part tracking section 120. The human frame information referred here is information including coordinates that allows determining a human frame.

Note that, as described above, human frame detecting section 110 detects a human frame using human feature data learned in advance, and thus there is a ease where no match with any of the human feature data is found. Accordingly, human frame detecting section 110 only intermittently detects a human body in temporally successive frames, and it is difficult to detect a human body that is constantly moving. In response to this problem, in Embodiment 1, the intermittent human body detection by human frame detecting section 110 is interpolated by using body part frame location determining section 122 to be described later. With this, human detection and tracking apparatus 100 according to Embodiment 1 is capable of detecting a human body and tracking a body part in all of successive frames.

Figure 2C:
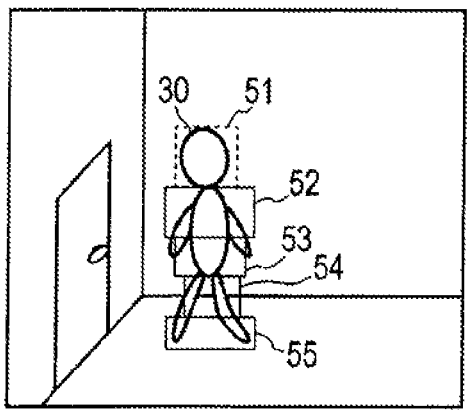

Body part frame setting section 121 receives image data for one frame and the human frame information from human frame detecting section 110. Subsequently, body part frame setting section 121 sets a default body part frame in an area of a human frame indicated by the human frame information. The body part frame refers an area where there is high possibility that a body part composing a human body is present. For example, body part frame setting section 121 divides a human frame into five equal parts in a vertical direction, and sets a default frame for each of a head part, a chest part, an abdomen part, a thigh part, and a leg part. FIG. 2C illustrates an example of the default body part frames. In FIG. 2C, as default body part frames, head part frame 51, chest part frame 52, abdomen part frame 53, thigh part frame 54, and leg part frame 55 are set for human body 30 included in human frame 40 (not illustrated).

After ending the setting for the default body part frames, body part frame setting section 121 sends body part frame setting ending notification to human frame detecting section 110. Body part frame setting section 121 also sends body part frame information indicating the default body part frames that are set to body part frame location determining section 122. The body part frame information here is information including coordinates that allow determining each body part frame, for example.

Figure 2D:
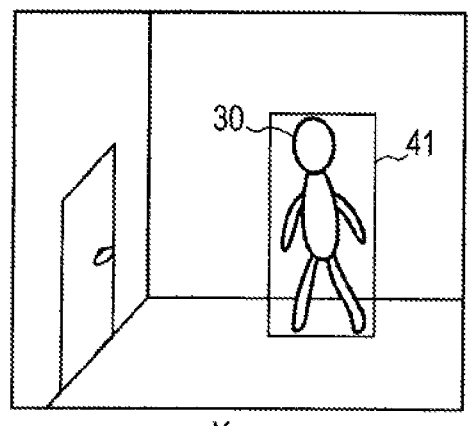

Body part frame location determining section 122 receives image data for one frame and human frame information from human frame detecting section 110. FIG. 2D illustrates an example of the image data. The image data illustrated in FIG. 2D is image data for one frame subsequent to image data in FIG. 2A, for example. In FIG. 2D, human body 30 is present at a location shifted from the location illustrated in FIG. 2A in a direction represented by arrow x. Human frame detecting section 110 detects human frame 41 for human body 30.

Accordingly, human frame information received from human frame detecting section 110 received, by body part frame location determining section 122 is information representing human frame 41.

The image data for one frame from human frame detecting section 110 received by body part frame location determining section 122 is hereafter referred to as "image data in the current frame" (an example of first image data). The image data in the current frame is image data in which locations of the body parts are not yet determined. In contrast, image data in a frame temporally preceding the image data in the current frame is hereafter referred to as "image data in the preceding frame" (an example of second image data). The image data in the preceding frame is image data in which locations of the body parts are determined. Accordingly, in Embodiment 1, the description is made using the image data in FIG. 2D as an example of image data in the current frame, and the image data in FIG. 2a as an example of the image data in the preceding frame.

Body part frame location determining section 122 sequentially sets a calculation range, calculates body part likelihood, and determines a body part frame location. The operations are described as follows. Note that, although the operations are performed separately for the body parts, the head part is described as an example in the following description.

First, body part frame location determining section 122 sets a calculation range for the image data in the current frame, based on the human frame information and the body part frame information. The calculation range refers to a range for calculating likelihood of a body part in the image data in the current frame. The body part frame information used here is either the body part frame information received from body part frame setting section 121 or the body part frame information, stored in body part frame location determining section 122. Stated differently, body part frame location determining section 122 uses the body part frame information received from body part frame setting section 121 when the body part frame location is not determined in the image data in the preceding frame or body part frame location determining section 122 does not store the body part frame information. In contrast, body part frame location determining section 122 uses the body part frame information when the body part frame location is determined in the image data in the preceding frame and the body part frame location determining section 122 stores the body part frame information.

Here, the setting for the calculation range is described with reference to specific examples. Here, the body part frame information received from body part frame setting section 121 is used.

First, body part frame location determining section 122 determines that human body 30 moves to right (in the direction of arrow x), based on a positional relationship between human frame 41 represented by the human frame information, and head part frame 51 represented by body part frame information.

Figure 2E:
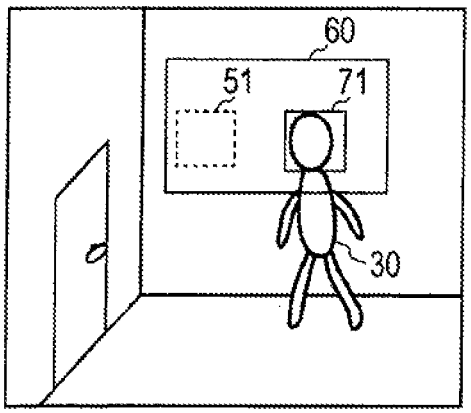

Subsequently, body part frame location determining section 122 sets a predetermined range from head part frame 51 toward right as a calculation range. FIG. 2E illustrates an example of the calculation range. In FIG. 2E, calculation range 60 sets a range including head part frame 51 and extended upward, downward, and rightward from head part frame 51.

As described above, calculation range 60 is set for head part frame 51.

Subsequently, body part frame location determining section 122 calculates body part likelihood of a region surrounded by the frame each time a frame having the same size as had pert frame 51 is moved by a predetermined distance in calculation range 60. With this, a plurality of values of body part likelihood are calculated. The body part likelihood is an index representing likelihood of a location of a body part frame in the image data in the preceding frame present in a location in the image data in the current frame. The body part likelihood is calculated based on body part feature data learned in advance. The body part feature data is data indicating a feature of a body part in a human body, and includes color information, luminance edge information, or texture information, for example.

Next, body part frame location determining section 122 determines a region where the largest value of the body part likelihood is calculated as a body part frame in the image data in the current frame. FIG. 2E illustrates an example of the body part frame. In FIG. 2E, region 71 is a region in which the largest value of the body part likelihood is calculated, and is a region determined as a head body part frame in the image data in the current frame, by body part frame location determining section 122. In the following description, region 71 is referred to as "bead part frame 71."

As described, above, the location in the head part is determined in the image data in the current frame illustrated in FIG. 2E. Note that, body part frame location determining section 122 determines a location in the image data in the current frame illustrated in FIG. 2E by performing the operation described above with regard to the chest part frame, the abdomen part frame, the thigh part frame, and the leg part frame. Accordingly, body part frame location determining 122 determines the location of each body part frame for a plurality of successive frames in the image data, which allows tracking of each body part frame for a plurality of frames.

Subsequently, body part frame location determining section 122 stores body part frame information illustrating each body part frame determined. The body part frame information described here is information illustrating a location of determined body part frame (that is, a relative positional relationship between body part frames), for example. The body part frame information stored here is used for setting the calculation range in the image data in the subsequent frame, as described above.

Body part frame location determining section 122 sends image data and the human frame information in the current frame to body part frame location correcting section 123, in addition to the body part frame information stored. The image data in the current frame here is the image data illustrating an entire image illustrated in FIG. 2E, for example. Here, human frame information illustrated here is human frame information illustrating human frame 41 illustrated in FIG. 2D.

Figure 2F:
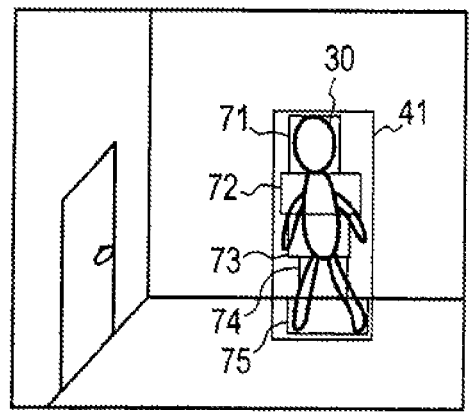

Body part frame location correcting section 123 receives the image data in the current frame, the human frame information, and the body part frame information from body part flame location determining section 122. Subsequently, body part frame location correcting section 123 corrects the location of each body part frame represented by the body part frame information matches a human flame indicated by the human frame information, in the image data of the current frame. FIG. 2F illustrates an example of the correction. In FIG. 2F, body part frame location correcting section 123 corrects locations of head part frame 71, chest part frame 72, abdomen part frame 73, thigh part frame 74, and leg part frame 75 so as to fit human frame 41.

The description for an exemplary configuration of human detection and tracking apparatus 100 according to embodiment 1 is as described above.

<Operation of Human Detection and Tracking Apparatus 100>

Figure 3:
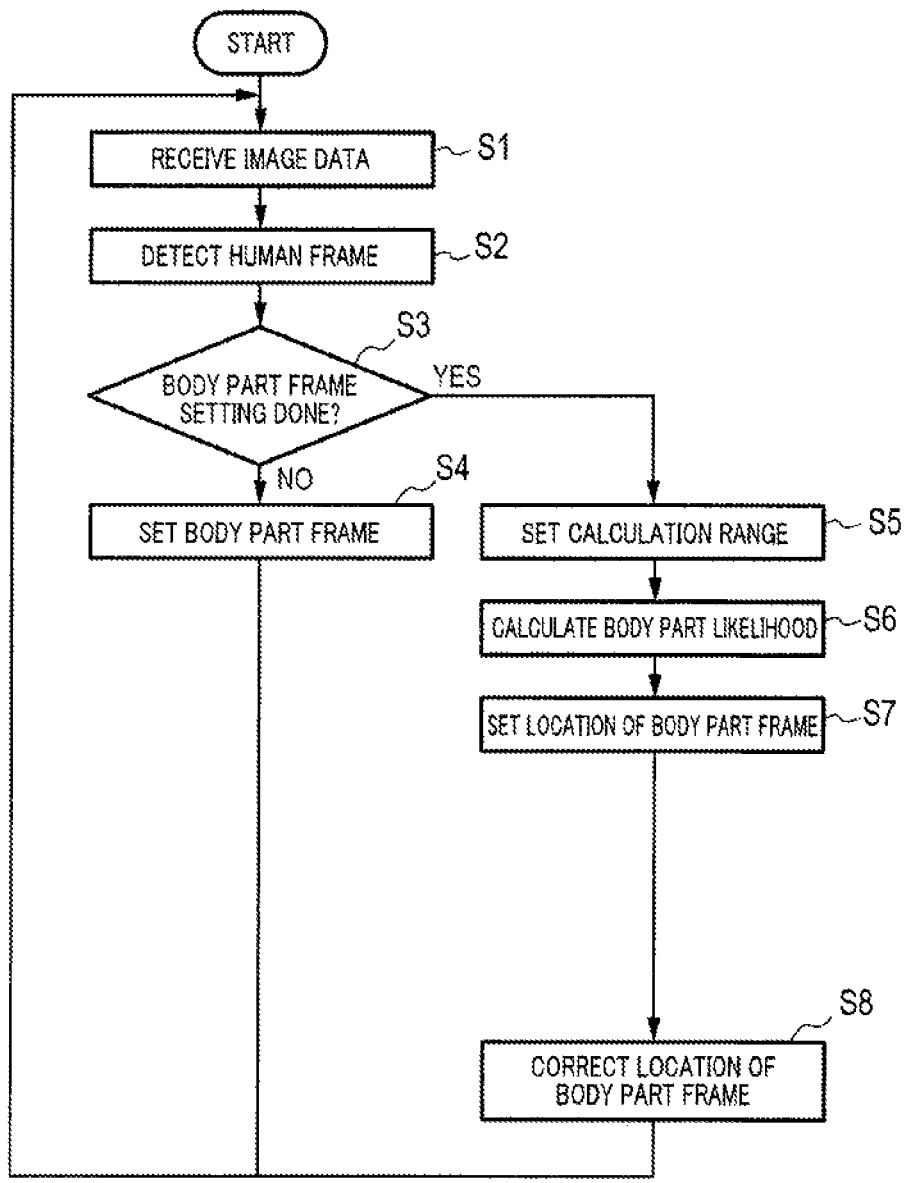
FIG. 3 is a flowchart illustrating an example of operation by the human detection and tracking apparatus according to Embodiment 1 of the present invention.

Next, an example of operation of human detection and tracking apparatus 100 according to Embodiment 1 will be described with reference to FIG. 3. FIG. 3 is a flowchart illustrating the example of the operation of human detection and tracking apparatus 100 according to Embodiment 1.

In step S1, human frame detecting section 110 receives the image data for one frame, from capturing section 200. The image data for one frame is the image data illustrated in FIG. 2A and the image data illustrated in FIG. 2D, for example.

In step S2, human frame detecting section 110 matches the image data for one frame and the human feature data learned in advance, and detects a region matching the human feature data in the image data as a human frame. The human frame is human frame 40 illustrated in FIG. 2B or human frame 41 illustrated in FIG. 2D.

In step S3, human frame detecting section 110 determines whether or not a default body part frame is set to a person included in a detected human frame, based on whether or not a notification indicating that the setting on body part frame ends from body part frame setting section 121 is present.

As a result of the determination in step S3, when the default body part frame is set (step S3: YES), human frame detecting section 110 sends the image data for one frame and the human frame information to part frame location determining section 122. The image data for one frame and the human frame information are the image data and human frame information illustrating human frame 41 illustrated in FIG. 2D, for example. Subsequently, the flow proceeds to step S5.

When the determination in the step S3 shows that the default body part frame is not set (step S3: NO), human frame detecting section 110 sends the image data for one frame and the human frame information to body part frame setting section 121. The image data for one frame and the human frame information are the image data illustrated in FIG. 2A and human frame information illustrating human frame 40. Subsequently, the flow proceeds to step S4.

In step S4, body part frame setting section 121 sets default body part frames within a human frame represented by the human frame information in the image data for one frame. The default body part frames include, for example, head part frame 51, chest part frame 52, abdomen part frame 53, thigh part frame 54, and leg part frame 55 as illustrated in FIG. 2C. Subsequently, body part frame setting section 121 sends body part frame setting ending notification indicating that the default body part frames has already been set to human frame detecting section 110. Body part frame setting section 121 also sends body part frame information indicating the default body part frames that are set to body part frame location determining section 122. The body part frame information is body part frame information representing head part frame 51, chest part frame 52, abdomen part frame 53, thigh part frame 54, and leg part frame 55 as illustrated in FIG. 2C, for example. Subsequently, the flow returns to step S1.

In step S5, body part frame location determining section 122 sets a calculation range in the image data for one frame (image data in the current frame), based on the human frame information and the body part frame information. One calculation range is set for a body part. The calculation range is calculation range 60 illustrated in FIG. 2E, for example.

Body part frame location determining section 122 calculates body part likelihood of a region surrounded by the frame each time a frame having the same size as a predetermined body part frame is moved by a predetermined distance in the calculation range. With this, values of body part likelihood are calculated. The values representing the body part likelihood are calculated for each body part.

Next, in step S7, body part frame location determining section 122 determines a region where the largest value of the body part likelihood is calculated in the calculation range 60 as a body part frame in the image data in the current frame. The determination on the body part frame is performed for each body part. The determined body part frame is, for example, head part frame 71 illustrated in FIG. 2E. Subsequently, body part frame location determining section 122 stores body part frame information illustrating each body part frame determined. The body part frame information is body part frame information representing head part frame 71, chest part frame 72, abdomen part frame 73, thigh part frame 74, and leg part frame 75 as illustrated in FIG. 2F, for example. Body part frame location determining section 122 sends image data and the human frame information in the current frame to body part frame location correcting section 123, with the body part frame information stored. The image data in the current frame here is the image data illustrating an entire image illustrated in FIG. 2E, for example. Human frame information illustrated here is human frame information illustrating human frame 41 illustrated in FIG. 2D.

Subsequently, in step S8, body part frame location correcting section 123 corrects the location of each body part frame represented by the body part frame information matches a human frame represented by the human frame information, in the image data in the current frame. The correction is performed such that locations of head part frame 71, chest part frame 72, abdomen part frame 73, thigh part frame 74, and leg part frame 75 match human frame 41 in FIG. 2F, for example. Subsequently, the flow returns to step S1.

The description for an exemplary operation of human detection and tracking apparatus 100 according to embodiment 1 is as described above.

As described above, human detection and tracking apparatus 100 according to Embodiment 1 corrects a relative positional relationship between determined body part frames, based on a human frame representing an absolute size and a location of a person for each image data in one frame. Accordingly, even when there is no difference between the values of likelihood between body part frames (that is, no difference in feature between body part frames is found), human detection and tracking apparatus 100 can maintain a relationship without differing the locations of the determined body part frames from true values (for example, body part frames are placed on the human body). Therefore, human detection and tracking apparatus 100 can prevent the errors in the size of the person and the location of each body part between the actual image data and the tracking result, achieving an accurate tracking result. Furthermore, when human detection and tracking apparatus 100 estimates a posture of a person using the obtained tracking result, human detection and tracking apparatus 100 can improve the accuracy of posture estimation.

Embodiment 2

Embodiment 2 of the present invention will be described with reference to the drawings. Embodiment 2 is different from Embodiment 1 in that a simplified estimation on a posture of a person is performed after each body part frame is located, and whether or not to perform the location correction on each body part frame is determined according to the estimation result.

<Configuration of Human Detection and Tracking Apparatus 101>

Figure 4:
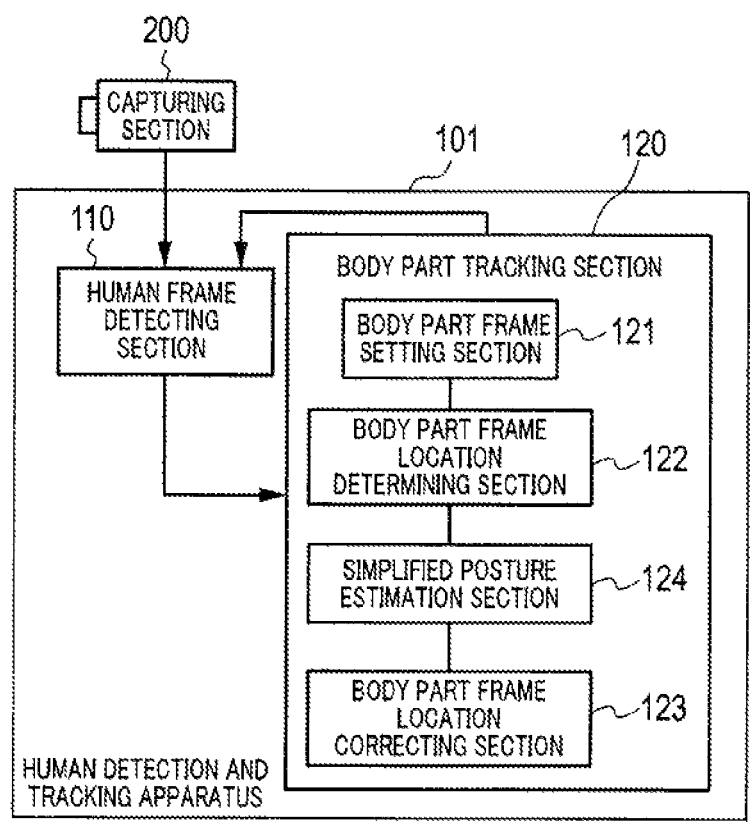
FIG. 4 is a block diagram illustrating an exemplary configuration of human detection and tracking apparatus according to Embodiment 2 of the present invention.

First, an exemplary configuration of human detection and tracking apparatus 101 according to Embodiment 2 will be described. FIG. 4 illustrates the example of the configuration of human detection and tracking apparatus 101 according to Embodiment 2. The configuration illustrated in FIG. 4 is different from the configuration in FIG. 1 in that simplified posture estimation section 124 is included. Accordingly, the following description focuses on the difference from the configuration illustrated in FIG. 1.

Simplified posture estimation section 124 receives the image data in the current frame, the human frame information, and the body part frame information from body part frame location determining section 122. Subsequently, simplified posture estimation section 124 estimates a posture of human body in the image data in the current frame, based on the relative positional relationship between body part frames each represented by the received body part frame information. For example, in FIG. 5A, simplified posture estimation section 124 estimates that the person in standing upright, based on a positional relationship in which the head part frame, the chest part frame, the abdomen part frame, the thigh part frame, and the leg part frame are arranged in a straight line along the vertical axis direction of the image data. In contrast, for example, in FIG. 5B, simplified posture estimation section 124 estimates that the person is tilting forward, based on the positional relationship that the head part frame, the lumbar part frame, and the leg part frame are arranged as if the line connecting the body part frames are angled.

Simplified posture estimation section 124 sends posture information representing an estimated posture (for example, standing upright or tilting forward) to body part frame location correcting section 123. Here, simplified posture estimation section 124 sends the image data in the current frame, the human frame information, and the body part frame information received from body part frame location determining section 122 together with the posture information to body part frame location correcting section 123.

Body part frame location correcting section 123 receives the image data in the current frame, the human frame information, the body part frame information, and the posture information from body part frame location determining section 122. Subsequently, body part frame location correcting section 123 determines whether or not the estimated posture matches the human frame, based on the human frame information and the posture information. Stated differently, body part frame location correcting section 123 determines whether or not a posture corresponding to a human frame represented by human frame information, and a posture illustrated by the posture information. For example, when a posture corresponding to the human frame represented by the human frame information (hereafter referred to as "posture of human frame") is standing upright, body part frame location correcting section 123 determines whether or not a posture represented by the posture information (hereafter referred to as "estimated posture") is standing upright.

When the determination result shows that the estimated posture matches the posture in the human frame, body part frame location correcting section 123 corrects the location of each body part frame represented by the body part frame information matches the human frame represented by the human frame information in the image data in the current frame. In contrast, when the determination result shows that the estimated posture does not fit the posture in the human frame, body part frame location correcting section 123 does not correct the positions of the body part frames.

The description for an exemplary configuration of human detection and tracking apparatus 101 according to embodiment 2 is as described above.

<Operation of Human Detection and Tracking Apparatus 101>

Figure 6:
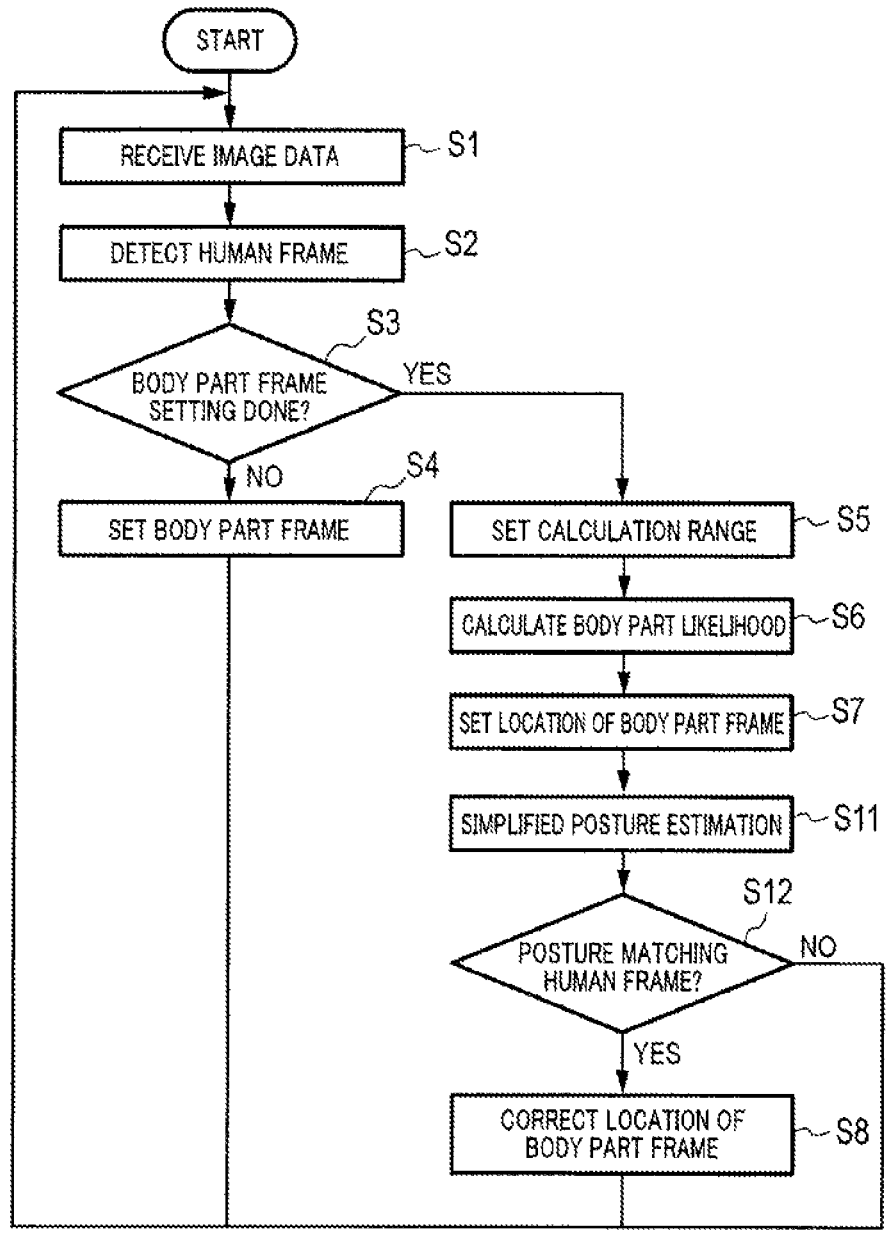
FIG. 6 is a flowchart illustrating an example of operation by the human detection and tracking apparatus according to Embodiment 2 of the present invention.

Subsequently, an example of operation of human detection and tracking apparatus 101 according to Embodiment 2 will be described with reference to FIG. 6. FIG. 6 is a flowchart illustrating the example of the operation of human detection and tracking apparatus 101 according to Embodiment 2. The flowchart illustrated in FIG. 6 is different from the flowchart in FIG. 3 in that steps S11 and S12 are included. Accordingly, in the following description, only the difference from the flowchart illustrated in FIG. 3 will be described.

Figure 5A:
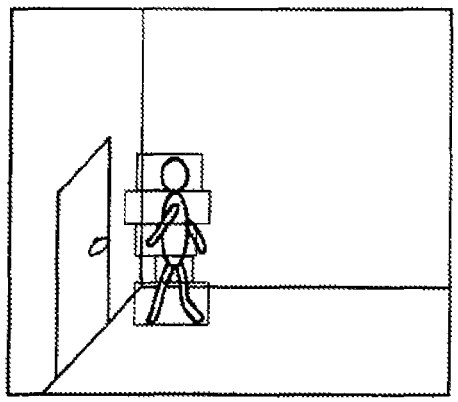
FIGS. 5A and 5B are diagrams for illustrating examples of processes performed by the human detection and tracking apparatus according to Embodiment 2 of the present invention.
Figure 5B:
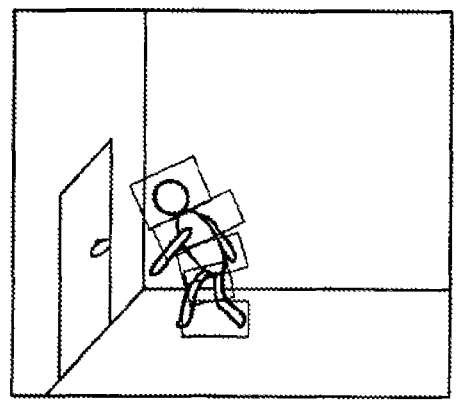

In step S11, simplified posture estimation section 124 estimates a posture of human body in the image data in the current frame, based on the relative positional relationship between each body part frames represented by the body part frame information. Stated differently, simplified posture estimation section 124 estimates whether the posture of the person is standing upright as illustrated in FIG. 5A or tilting forward as illustrated in FIG. 5B. Subsequently, simplified posture estimation section 124 sends the posture information representing the estimation result to body part frame location correcting section 123, with the image data in the current frame, the human frame information, and the body part frame information received from body part frame location determining section 122.

In step S12, body part frame location correcting section 123 determines whether or not the posture represented by posture information (estimated posture) fits a posture corresponding to the human frame represented by the received human frame information. For example, when the posture of the human frame is standing straight, body part frame location correcting section 123 determines whether or not the estimated posture is standing straight.

As a result the determination in step S12, the flow proceeds to step S8 when the estimated posture fits a posture in the human frame (step S12: YES).

In step S8, body part frame location correcting section 123 corrects the location of each body part frame represented by the body part frame information matches a human frame illustrated by the human frame information, in the image data of the current frame. Subsequently, the flow returns to step S1.

As a result of the determination in step S12, when the estimated posture does not it the posture in the human frame (step S12: NO), body part frame location correcting section 123 does not correct the locations of the body part frames represented by the body part frame information. Subsequently, the flow returns to step S1.

The description for an exemplary operation of human detection and tracking apparatus 101 according to Embodiment 2 is as described above.

As described above, human detection and tracking apparatus 101 according to Embodiment 2 can achieve the following functions and effects by including simplified posture estimation section 124, in addition to the effects achieved by Embodiment 1. More specifically, human detection and tracking apparatus 101 limits a case for correcting the location of the body part frame using the human frame to a case where an estimated posture matches the posture of the human frame. Stated differently, when the estimated posture does not match the posture in the human frame, human detection and tracking apparatus 101 does not correct the location of the body part frame using the human frame. With this, human detection, and tracking apparatus 101 can perform correction on the position of the body part frames more accurately than Embodiment 1.

Variation of Embodiment

Embodiments 1 and 2 are as described above. However, the description above is examples, and various modifications are possible. The following is the description for a variation.

In Embodiments 1 and 2, a feature used for detecting the human frame (human feature data) and a feature used for determining the body part frame are any of color information, luminance edge information, or texture information as an example. However, in Embodiments 1 and 2, any combination of the information may be used.

In addition, in Embodiments 1 and 2, the determination on each body part frame in the image data in the current frame is based on a region where the largest value of the body part likelihood is calculated. However, it is not limited to this example. For example, body part frame location determining section 122 may operate as described below. First, body part frame location determining section 122 selects a plurality of regions having a value of body part likelihood greater than or equal to the determined threshold, among the plurality of regions in which the values representing body part likelihood are calculated. Next, body part frame location determining section 122 extracts coordinates of the prescribed location (hereafter referred to as "base point"). Subsequently, body part frame location determining section 122 calculates an average value of the coordinates of a plurality of extracted base points, and determines average values as coordinates of a new base point. Subsequently, body part frame location determining section 122 determines a region based on the coordinates of the new base point (the same size as the region when calculating the body part likelihood) as a body part frame in the image data in the current frame. As described above, a body part frame in the image data in the current frame may be determined by calculating an average value of the regions in which the body part likelihood is greater than or equal to the threshold.

In addition, Embodiments 1, 2, and variations of embodiments are described using a case where the present invention is configured as hardware; however, the present invention may be implemented as software in relation to the software.

As described above, the human detection and tracking apparatus according to the present disclosure includes a human frame detecting section that detects, from first image data, a human frame as a region having high possibility of presence of a human, based on human feature data representing a feature of an entire human body; a body part frame location determining section that determines at body part frame in the first image data, based on body part feature data illustrating a feature of a body part of the human and a body part frame determined as a region having high possibility of presence of a body part of the human in second image data previous to the first image data; and a body part frame location correcting section that corrects, based on the human frame, a location of the body part frame determined in the first image data.

Alternatively, in the human detection and tracking apparatus according to the present disclosure further includes a simplified posture estimation section that estimates a posture of the human in the first image data, based on the location of the body part frame determined by the body part frame location determining section, in which, when the posture of the human estimated by the simplified posture estimation section matches the human frame, the body part frame location correcting section corrects a location of a body part frame based on the human frame, the location being determined in the first image data.

Alternatively, in the human detection and tracking apparatus according to the present disclosure, when the posture of the human estimated by the simplified posture estimation section does not match the human frame, the body part frame location correcting section does not correct the location of the body part frame determined in the first image data.

Alternatively, in the human detection and tracking apparatus according to the present disclosure, the body part frame location determining section (i) sets a calculation range based on the body part frame determined in the second image data and the human frame detected in the first image data, (ii) calculates, in the calculated range, body part likelihood based on the body part feature data for each region having a size identical to a size of the body part frame determined in the second image data, and (iii) determines a region selected based on the body part likelihood as a body part frame in the first image data.

Alternatively, the human detection and tracking apparatus according to the present disclosure further includes a body part frame setting section that sets a default body part frame in the first image data based on the human frame, when the body part frame is not determined in the second image data.

Alternatively, in the human detection and tracking apparatus according to the present disclosure, the body part frame setting section divides the human frame into regions in a vertical direction, and sets each of the divided regions as the default body part frame.

Alternatively, the human detection and tracking method according to the present disclosure includes detecting, from first image data, a human frame as a region having high possibility of presence of a human, based on human feature data representing a feature of an entire human body; determining a body part frame in the first image data, based on body part feature data illustrating a feature of a body part of the human and a body part frame determined as a region having high possibility of presence of a body part of the human in second image data previous to the first image data; and correcting, based on the human frame, a location of the body part frame determined in the first image data.

Alternatively, the human detection and tracking program according to the present disclosure causes a computer to execute processing, the processing including: detecting, from first image data, a human frame as a region having high possibility of presence of a human, based on human feature data representing a feature of an entire human body; determining a body part frame in the first image data, based on body part feature data illustrating a feature of a body part of the human and a body part frame determined as a region having high possibility of presence of a body part of the human in second image data previous to the first image data; and correcting, based on the human frame, a location of the body part frame determined in the first image data.

INDUSTRIAL APPLICABILITY

The present invention is useful for an apparatus, a method, a program, and others capable of detecting a person from image data and tracking a body part of the person for a plurality of successive frames.

REFERENCE SIGNS LIST

100, 101 Human detection and tracking apparatus
110 Human frame detecting section 120 Body part tracking section
121 Body part frame setting section
122 Body part frame location determining section
123 Body part frame location correcting section
124 Simplified posture estimation section
200 Capturing section

The invention claimed is:

1. A human detection and tracking apparatus comprising:
a human frame detecting section that detects, from first image data in a current frame, a human frame as a region having a high possibility of presence of a human, based on human feature data representing a feature of an entire human body;
a body part frame location determining section that determines a plurality of body part frames in the first image data, based on (i) body part feature data illustrating a feature of a body part of the human and (ii) a plurality of body part frames determined as regions having a high possibility of presence of each body part of the human in second image data in a preceding frame; and
a body part frame location correcting section that corrects, based on the human frame, each location of the plurality of body part frames determined in the first image data so as to match the human frame,
wherein the body part frame location determining section (i) sets a calculation range based on the plurality of body part frames determined in the second image data and the human frame detected in the first image data, (ii) calculates, in the calculated range, body part likelihood based on the body part feature data for each region having a size identical to a size of the body part frames determined in the second image data, and (iii) determines a region selected based on the body part likelihood as a body part frame in the first image data.

2. The human detection and tracking apparatus according to claim 1, further comprising
a simplified posture estimation section that estimates a posture of the human in the first image data, based on the location of the plurality of body part frames determined by the body part frame location determining section, wherein, when the posture of the human estimated by the simplified posture estimation section matches the human frame, the body part frame location correcting section corrects each location of the plurality of body part frames based on the human frame, the location being determined in the first image data.

3. The human detection and tracking apparatus according to claim 2, wherein, when the posture of the human estimated by the simplified posture estimation section does not match the human frame, the body part frame location correcting section does not correct each location of the body part frames determined in the first image data.

4. The human detection and tracking apparatus according to claim 1, further comprising
a body part frame setting section that sets a default body part frame in the first image data based on the human frame, when the body part frame is not determined in the second image data.

5. The human detection and tracking apparatus according to claim 4, wherein
the body part frame setting section divides the human frame into regions in a vertical direction, and sets each of the divided regions as the default body part frame.

6. A human detection and tracking method comprising:
detecting, from first image data in a current frame, a human frame as a region having a high possibility of presence of a human, based on human feature data representing a feature of an entire human body;
determining a plurality of body part frames in the first image data, based on (i) body part feature data illustrating a feature of a body part of the human and (ii) a plurality of body part frames determined as regions having a high possibility of presence of each body part of the human in second image data in a preceding frame; and
correcting, based on the human frame, each location of the plurality of body part frames determined in the first image data so as to match the human frame,
wherein the determining step (i) sets a calculation range based on the plurality of body part frames determined in the second image data and the human frame detected in the first image data, (ii) calculates, in the calculated range, body part likelihood based on the body part feature data for each region having a size identical to a size of the body part frames determined in the second image data, and (iii) determines a region selected based on the body part likelihood as a body part frame in the first image data.

7. A human detection and tracking program stored on a non-transitory computer-readable medium causing a computer to execute processing, the processing comprising:
detecting, from first image data in a current frame, a human frame as a region having a high possibility of presence of a human, based on human feature data representing a feature of an entire human body;
determining a plurality of body part frames in the first image data, based on (i) body part feature data illustrating a feature of a body part of the human and (ii) a plurality of body part frames determined as regions having a high possibility of presence of each body part of the human in second image data in a preceding frame; and
correcting, based on the human frame, each location of the plurality of body part frames determined in the first image data so as to match the human frame,
wherein the determining step (i) sets a calculation range based on the plurality of body part frames determined in the second image data and the human frame detected in the first image data, (ii) calculates, in the calculated range, body part likelihood based on the body part feature data for each region having a size identical to a size of the body part frames determined in the second image data, and (iii) determines a region selected based on the body part likelihood as a body part frame in the first image data.

8. The human detection and tracking method according to claim 6, further comprising
estimating a posture of the human in the first image data, based on the location of the plurality of body part frames determined by the determining step, wherein, when the posture of the human estimated by the estimating step matches the human frame, the correcting step corrects each location of the plurality of body part frames based on the human frame, the location being determined in the first image data.

9. The human detection and tracking method according to claim 8, wherein, when the posture of the human estimated by the estimating step does not match the human frame, the correcting step does not correct each location of the body part frames determined in the first image data.

10. The human detection and tracking method according to claim 6, further comprising
setting a default body part frame in the first image data based on the human frame, when the body part frame is not determined in the second image data.

11. The human detection and tracking method according to claim 10, wherein
the setting step divides the human frame into regions in a vertical direction, and sets each of the divided regions as the default body part frame.

12. The human detection and tracking program according to claim 7, further comprising
estimating a posture of the human in the first image data, based on the location of the plurality of body part frames determined by the determining step, wherein, when the posture of the human estimated by the estimating step matches the human frame, the correcting step corrects each location of the plurality of body part frames based on the human frame, the location being determined in the first image data.

13. The human detection and tracking program according to claim 12, wherein, when the posture of the human estimated by the estimating step does not match the human frame, the correcting step does not correct each location of the body part frames determined in the first image data.

14. The human detection and tracking program according to claim 7, further comprising
setting a default body part frame in the first image data based on the human frame, when the body part frame is not determined in the second image data.

15. The human detection and tracking program according to claim 14, wherein
the setting step divides the human frame into regions in a vertical direction, and sets each of the divided regions as the default body part frame.

* * * * *